United States Patent [19]

Madey et al.

[11] Patent Number: 4,740,973
[45] Date of Patent: Apr. 26, 1988

[54] FREE ELECTRON LASER

[76] Inventors: John M. J. Madey, 2120 Amherst St., Palo Alto, Calif. 94306; David A. G. Deacon, 745 Duncardine Way, Sunnyvale, Calif. 94087; Michel Velghe, 22, Domaine de Miremont, Gif sur Yvette, France, 91190; Michel Billardon, 27, rue A. Hovelacque, Paris, France, 75013; Yves Petroff, 49, rue Jeanne d'Arc, Saint-Mande, France, 94160; Jean-Michel Ortega, 5, place de Rungis, Paris, France, 75013; Pascal Elleaume, 29, place Jeanne d'Arc, Paris, France, 75013; Claude Bazin, 55, avenue de la Cure d'Air, Orsay, France, 91400; Maurice Bergher, 59, rue de la Hacquinière, Bures sur Yvette, France, 91440

[21] Appl. No.: 736,494

[22] Filed: May 21, 1985

[30] Foreign Application Priority Data

May 21, 1984 [FR] France ................ 84 07898

[51] Int. Cl.⁴ .............................. H01S 3/00
[52] U.S. Cl. ........................... 372/2; 315/5; 372/29
[58] Field of Search .............. 372/2, 29, 26; 315/4, 315/5

[56] References Cited

U.S. PATENT DOCUMENTS 3,822,410 2/1974 Madey .
4,491,948 1/1985 Deacon et al. ............. 372/2

FOREIGN PATENT DOCUMENTS 2065363 6/1981 United Kingdom .

OTHER PUBLICATIONS

D. A. G. Deacon, Storage Ring Free Electron Lasers, Experimental Progress and Future Prospects, Nuclear Instruments & Methods in Physics Research, vol. 205, pp. 171-176, (North Holland Publishing Co., 1983).

Primary Examiner—Leon Scott, Jr.
Attorney, Agent, or Firm—Townsend and Townsend

[57] ABSTRACT

The invention envisages control devices acting on the laser to vary in time the electron/photon interaction, means proceeding to a State I in which they alter the optimal conditions for laser amplification; and a State II in which that reestablish said optimal conditions, which control devices permit the improvement of the peak amplitude and stability of the laser pulses and the rate and stability of the pulse period. According to another aspect of this invention, the two states are alternated, preferably periodically or almost periodically. The duration of State I should be selected by comparison with the characteristics of the electron packet and, in particular of the relaxation time observed for said packet. If the duration of State II is set to a value to be comparable to or longer than the electron relaxation time, the peak amplitude of the laser pulses is increased. The duration of State II should be selected by comparison with the natural macropulse width. If the duration of the State II is set to a value shorter than the natural duration of the laser macropulses, the repetition rate of the laser pulses can be increased.

46 Claims, 7 Drawing Sheets

13 M SEC

80 M SEC

FREE ELECTRON LASER

The government has rights in this invention pursuant to Contract No. F49620-83-K-0030, awarded by the United States Air Force.

BACKGROUND OF THE INVENTION

The invention describes means to stabilize free electron lasers.

Free electron lasers include a charged particle accelerator, a straight section, means to inject a relativistic electron or positron beam from the accelerator into the straight section, an undulator mounted coaxially along said straight section, which undulator periodically modulates in space the acceleration of the electrons passing through it thereby inducing the electrons to produce a light beam practically colinear with the axis of the undulator, and an optical cavity defined by two mirrors mounted facing each other on either side of the undulator to permit the circulation of the light thus emitted, so that a laser amplification occurs when the period of said circulation of light coincides with the period of passage of the electron packets and the optical gain per passage exceeds the light losses which occur in the optical cavity.

We note in passing that particle accelerators operate as well with electrons as with positrons which are the homologues of electrons with a charge of the opposite sign. Both kinds of particles belong to the class of charged leptons. The light is herein defined as electromagnetic radiation including not only the visible range but also the range of neighboring wavelengths in the near and far infrared as well as in the ultraviolets (so-called "vacuum ultraviolets") and even x-rays. Finally, we have spoken above of the coincidence between the circulation period of light and the period of passage of the electrons. Of course, said coincidence can be obtained not only when the periods are equal, but also when they are full multiples of each other or both full multiples of the same time span.

Free electron lasers present significant advantages over the lasers presently used in the industry. Actually, free electron lasers are expected to provide a power output superior to the power available from the traditional lasers. They present, in addition, the possibility of being tuned continuously over a wide range of wave lengths.

However, the first experiments showed certain erratic aspects of laser operation.

SUMMARY OF THE INVENTION

The present invention solves a number of the difficulties encountered in these first lasers by stabilizing the power output and pulse repetition rate of the laser.

In a very general definition, the invention envisages control devices acting on the laser to vary in time the electron/photon interaction, said means proceeding to a State I in which they alter the optimal conditions for laser amplification; and a State II in which they reestablish said optimal conditions, which control devices permit the modulation of the laser and also permit the improvement of the peak amplitude and stability of the laser pulses and the rate and stability of the pulse period.

According to another aspect of this invention, the two states are alternated, preferably periodically or almost periodically. The duration of State I should be selected by comparison with the characteristics of the electron packet and, in particular, of the relaxation time observed for the latter. If the duration of State II is set to a value to be comparable to or longer than the electron relaxation time, the peak amplitude of the laser pulses is increased. The duration of State II should be selected by comparison with the natural macropulse width. If the duration of State II is set to a value shorter than the natural duration of the laser macropulses, the repetition rate of the laser pulses can be increased.

For certain applications there is practically no laser amplification during State I. For other applications, a smaller laser amplification is maintained in State I which permits modulation of the laser.

The accelerator devices are preferably of a recirculating type such as a storage ring. In these embodiments, the control devices can act on at least one of the characteristics of the electrons such as their geometry, their energy dispersion and their trajectory in the undulator.

The control devices can also act on the repetition rate of the electron packets. In the special case of a storage ring, a high frequency cavity incorporated in said storage ring and driven by a variable frequency oscillator can be used as the control device.

In one particular embodiment, the control devices include devices designed to displace upon command the axis of the electrons trajectory in relation to the axis of the undulator. Such devices may employ an electrical and/or magnetic field, switchable upon command to deflect the various independent electron packages.

It is also possible to envisage that the control devices act on at least one of the optical characteristics of the cavity such as its length, the direction of its optical axis and its losses.

In turn, the undulator will advantageously include a periodic magnetic structure extending along the axis of the optical cavity and providing a stationary magnetic field, adjustable in amplitude and with selected spatial period.

In one application, the control devices react to a signal representing one of the operational parameters of the laser, by means of which the control is effected not from an outside signal but as a counter-reaction of the laser itself.

Finally, while the preferred accelerator means is a storage ring, a linear microwave or induction accelerator or an electrostatic accelerator of the so-called Van De Graaff accelerator type could also be used.

Other characteristics and advantages of the invention become clear upon examination of the description given hereafter and the enclosed drawings in which:

DESCRIPTION OF THE FIGURES

FIGS. 13, 14 and 15 show still other variations of the means of control; and

DETAILED DESCRIPTION OF THE PREFERRED EMBODIMENT

Figure 1:
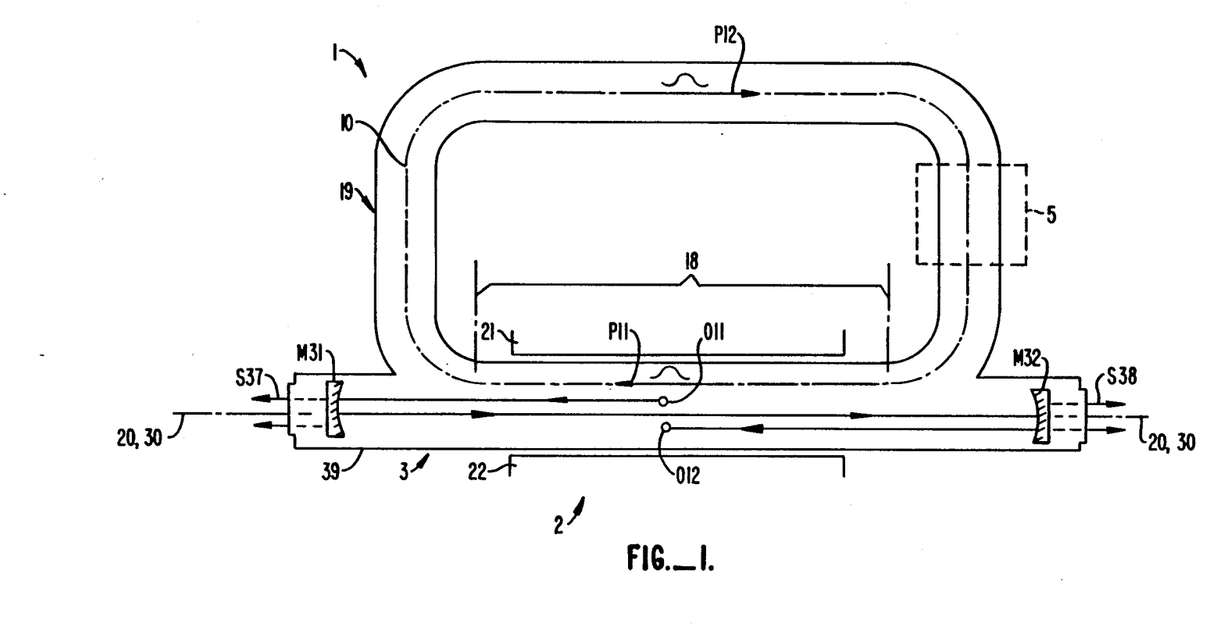
FIG. 1 is a basic schematic of a free electron laser according to this invention using a storage ring.

In FIG. 1, a storage ring of charged particles is marked (1), also called a collision ring, in accordance with the applications of storage rings in high energy particle physics experiments. Such a ring may be defined as a closed circuit involving rectilinear sections interconnected by magnets or electromagnets whose function it is to curve the trajectory of the particles inward in order to conform to a closed orbit. The axis of the trajectory of the particles is defined by the dashed line 10. The interior of the ring is, of course, maintained under vacuum inside wall 19.

In the present invention, one or more electron packets circulate inside the ring along axis 10. In the embodiment shown, two electron packets P11 and P12 are used, circulating at 180° to each other (it is usual to define the phase of the electron packets along the ring in accordance with their revolution period in the latter).

In the Orsay collision ring, it is possible to obtain a pulsed electron beam structure, the pulses going from 0.3 to 1 nanosecond in width. The rate of repetition of the pulses depends upon the diameter of the ring and the number of electron packets injected into said ring (by means here not shown). In the embodiment cited, the rate of repetition is 27 MHz for two electron packets which corresponds to a temporal period of 37 nanoseconds (while the revolution period of the individual packets is 74 nanoseconds). The energy of an electron in the packet is defined by a quantity $\gamma$, defined as the ratio of the effective energy E of the electron and its rest mass energy $m_0c^2$, in which $m_0$ is the mass of the electron and c the speed of light. In the case of the Orsay collision ring, the quantity $\gamma$ can be varied between about 300 and 1000.

Figure 2:
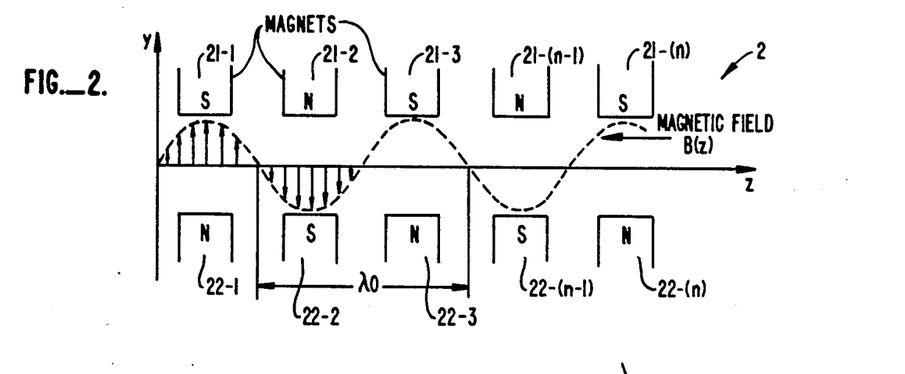
FIG. 2 is a basic schematic of an undulator used in the device according to FIG. 1.

An accelerator such as 1 has one or more straight line sections between its magnets. On one of these sections an undulator is mounted, formed by a series of magnetic poles of opposite polarity 21 and 22 installed facing each other. FIG. 2 shows schematically how an undulator is made up of pairs of poles such as 21-1, 22-1, etc., 21-n, 22-n.

In the case of the Orsay collision ring, the available length of the straight section is 1.30 m and it has been possible to mount in this space a permanent magnet undulator having 17 full spatial periods optimized for electrons with an energy of 240 MeV. To improve the performance of the undulator, it proved desirable to modify part of the undulator to form an optical klystron. This was done by replacing the three central periods of the undulator with a three-pole dispersive section. Note that a simple undulator can be sufficient to obtain a lasing according to this invention if sufficient length is available in the straight section.

In FIG. 1, the line marked 20 defines the axis of the undulator 2. It also defines at reference 30, the axis of an optical cavity 3 defined by the two mirrors M31 and M32, slightly concave and turned towards each other. Said mirrors permit the circulation of the light beam along axis 10 and/or 30. These mirrors also introduce losses as indicated in FIG. 1 by the light signals to the outside, respectively S37 for mirror M31 and S38 for mirror M32.

As we shall see further on, the length of the optical cavity defined between mirrors M31 and M32 must be set with precision around a value close to 5.5 m in the LURE FEL. Experimentally, the length had to be set to a precision better than ±5 microns.

We must now explain the spontaneous emission of light produced by electrons moving through the undulator.

As shown in FIG. 2, the undulator 2 has a spatially periodic magnet structure which we assume to be associated with a linearly polarized magnetic field defined by the following equation:

$$B(z) = B_0 \sin(2\pi z/\lambda_0)$$

in which $\lambda_0$ is the period of the undulator, $B_0$ the maximum magnetic induction and z the axis of the undulator. Linear polarization is assumed only for the sake of illustration; the undulator could equally well be circularly or elliptically polarized.

Figure 3:
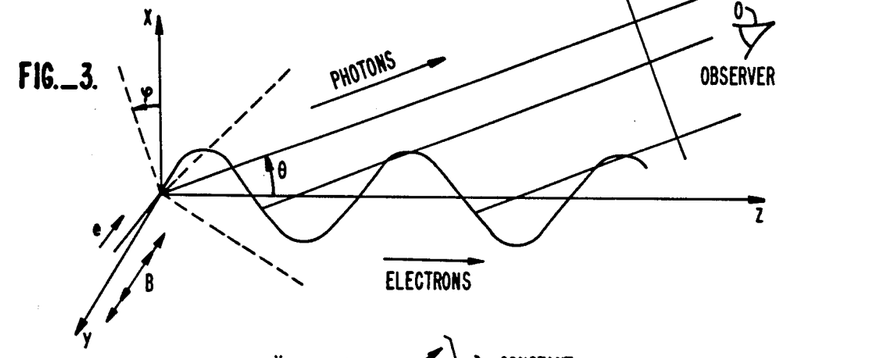
FIG. 3 is a schematic showing the synchrotron radiation of an electron subject to a transverse magnetic field.

We now refer to FIG. 3. If an electron is propagated along axis z, said electron moves in a sinusoidal trajectory on a plane perpendicular to the magnetic field. The electron then constitutes an oscillating dipole moving at relativistic velocity along the axis of the undulator. Photons emitted by the electrons, especially in direction $\theta$ and may be observed at O. $\Psi$ designates the angle which defines the direction of emission relative to the x axis.

With high energy electrons which can be obtained using linear accelerators or storage rings (some hundreds or thousands of MeV), the characteristics of radiation are determined by the relativistic motion of the electrons as determined by the quantity $\gamma$ defined above.

Figure 4A:
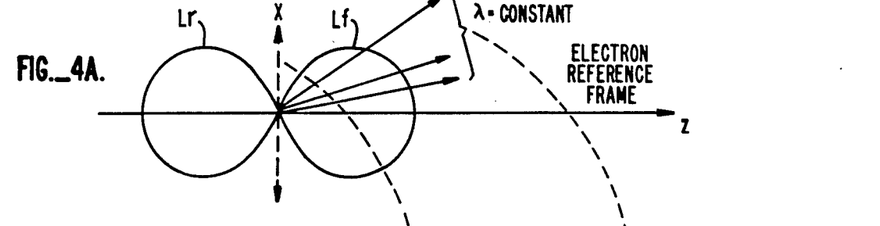
FIGS. 4A and 4B show the radiation produced by this electron, respectively in a tridimensional frame of reference for the electron and in a fixed frame of reference such as the one in the laboratory.

If one takes a reference frame (FIG. 4A) which moves along axis z at the average speed of the electrons, the undulator is seen by the electrons as an electromagnetic wave of period $\lambda'$ approximately equal to $\lambda_0/\gamma$ as determined by the relativistic transformation of the magnetic fields. The electrons subject to this electromagnetic field act as a classical dipole oscillator to radiate a new electromagnetic field at the wavelength $\lambda'$. In the electron reference, the radiation emitted by the oscillating dipoles is confined within fairly large lobes, $L_f$ (forwards) and $L_r$ (backwards).

Figure 4B:
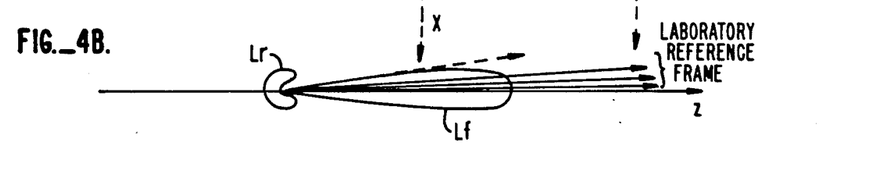

In the laboratory frame (FIG. 4B), the radiation pattern is determined by the relativistic transformation of angles from the electron rest frame. In general, angles in the forward direction in the electron rest frame (FIG. 4A) are projected to within a few milliradians of the z axis thus confining almost the entire forward radiation pattern into a cone of some milliradians opening. In turn, the opening angle of rear lobe Lr is greatly enlarged, and the strength of the rear lobe is generally weakened.

The emission wavelength is then determined by the Doppler effect and for the fundamental term it has been observed that one obtains approximately $$\lambda = \frac{\lambda_0}{2\gamma^2} (1 + K^2/2 + \gamma^2\theta^2)$$

where $$K = \frac{eB_0\lambda_0}{2\pi m_0 c^2}$$

characterizes the magnetic field and typically varies between 0 and 2.5, while $\theta$ is the angle of emission of the light relative to the propagation axis of the electron.

Thus, it happens that the spontaneous emission of the undulators constitutes a light source of very low divergence which can be rendered almost monochromatic, since its spectral width is determined by the number of periods of the undulator. What is more, said spontaneous emission can be tuned to a wide spectral range by varying the energy of the electrons and/or the magnetic field. Finally, the spectral brilliance of this light source can be by several orders of magnitude higher than that of traditional synchrotron radiation sources. This source is thus especially interesting in the range of x-rays (soft) and vacuum ultraviolet, while also having advantages in other parts of the electromagnetic radiation spectrum.

Figure 5:
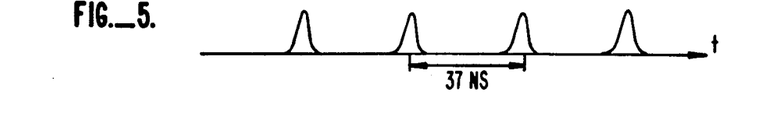
FIG. 5 shows the general time dependence of the synchrotron radiation.

We now make reference to FIG. 5, which shows that the repetition period of the electron packets in the undulator 2. The explanation above shows that the electrons will emit photon packets spaced 37 nanoseconds apart as shown in FIG. 5. The photon pulses have a width of about 1 nanosecond for the two electron packets.

The photons thus created are stored in the optical cavity 3 which is placed in a vacuum chamber defined by the enclosure 39 and communicating with enclosure 19 of the storage ring.

In practice, the length of the optical cavity which is close to 5.5 m must be adjusted with precision to synchronize the photon pulses and electron pulses or packets, since a variation of length of ±5 microns is sufficient to stop the lasing action.

Laser operation has been observed under the conditions described above as reported in the article "First Operation of a Storage Ring Free Electron Laser" by M. Billardon, et al., Phys. Rev. Lett. (1983) 1651, 1652. The operating conditions mentioned in said article are incorporated in this description to provide more detailed background information, and a more complete description of the conditions required to obtain the laser effect.

Figure 6A:
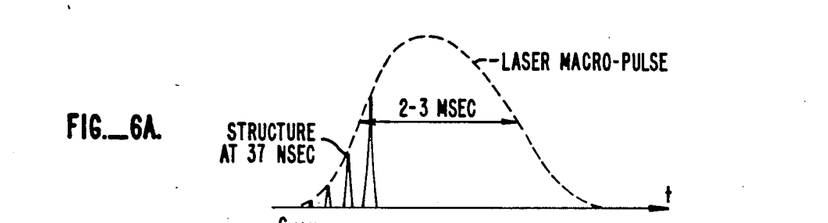
FIGS. 6A and 6B are two diagrams illustrating the time structure of the macropulses in a free electron laser.
Figure 6B:
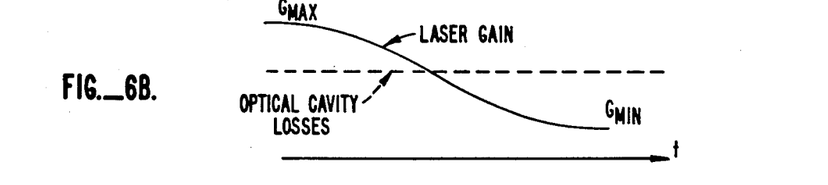
Figure 7A:
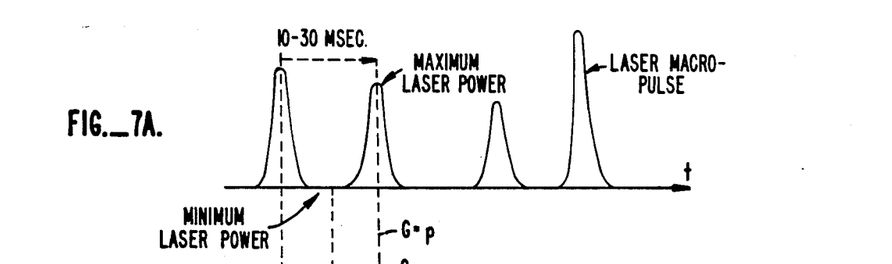
FIGS. 7A and 7B are two figures showing the structure of the macropulses over a longer time scale.
Figure 7B:
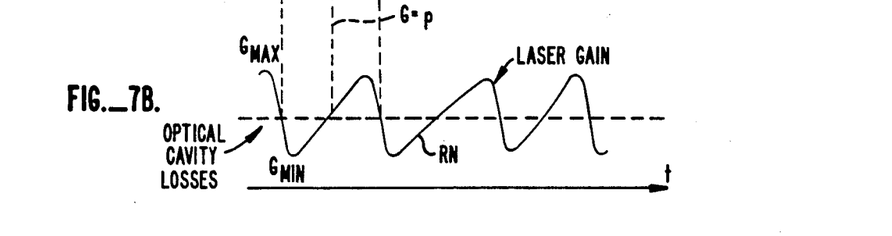

For the description of the laser effect, we now refer to FIGS. 6A and 6B as well as FIGS. 7A and 7B.

The basic temporal structure of the laser is determined by the rotation period of the electrons in the ring. The free electron laser is thus pulsed at 27 MHz. While the duration of said basic pulses has not yet been measured with precision; they have been determined to be shorter than 0.5 nanoseconds.

On a much longer time scale, the laser is not continuous, but is characterized by a new pulse structure occurring on a longer time scale than the above-mentioned basic time scale; we call these new pulses "macropulses."

As shown in FIG. 6A, said macropulses have a duration of about 2-3 milliseconds and a period from 10 to 30 milliseconds (FIG. 7A). It has been established by the inventors that the interaction between the photons and electrons causes a modification of characteristics of the electron packet. This leads not only to saturation of the laser power but also to a reduction of the gain which stops the lasing action until the energy spread induced by laser action has been damped, and lasing action can resume.

While the full details of this phenomena are still incompletely understood the general effect on the laser gain is clear. FIG. 6B shows the estimated response of the laser gain for the duration of a macropulse such as shown in FIG. 6A. Note that this gain is defined by the following equation:

$\phi s/\phi e = 1 + G$, in which $\phi s$ is the luminous flux entering the undulator, $\phi e$ is the flow emerging from the undulator and G is the gain per pass.

Of course, to obtain a laser effect, the following conditions must be met. The rotation period of the electrons in the ring must be synchronized with the round-trip time of the photons in the optical cavity. The trajectory of the electrons in the undulator must also coincide with the optical axis of the cavity. If this condition is not met, the photons emitted by the electrons are not effectively stored in the cavity and the coupling of the electrons and the photons is diminished.

Assuming that these two conditions are met, laser gain is obtained. The actual value of the gain is determined by the electronic density of the electron packet, i.e. the average current circulating in the ring, as well as the transverse and longitudinal dimensions of the electron packet and the length, period and field strength of the undulator.

Since the reflection coefficient of the mirrors will always be less than 100%, the light wave in the cavity always loses part of its energy at each reflection. The coefficient of loss of the optical cavity for one cycle of the photons through the undulator and cavity is called p, p being the fraction of luminous energy lost (more generally this quantity p should be defined based on the time interval between the interaction of the electrons and photons if this interaction does not take place at each cycle).

The net optical amplification, including the laser gain and cavity losses, is equal to the difference G−p. If G is smaller than p, there is no net amplification. While, if G is larger than p, we obtain a laser effect. Thus, we find that laser operation depends upon the losses of the cavity.

The laser effect also depends upon the energy of the electrons and the amplitude of the undulator magnetic field.

In FIG. 6B, we associated with a laser macropulse, starting in FIG. 6A, a gain which decreases by a quantity $G_{max}$ to a value $G=p$ which practically occurs at the peak of the macropulse. Thereafter, the gain decreases to a value $G_{min}$. From FIG. 6B, we note that if a given net gain is established, the macropulses (FIG. 5) will be amplified at each passage through the undulator as long as the gain is higher than the losses p. But, this interaction of the electrons and photons leads not only to amplification but also to a modification of the characteristics of the electron beam specifically, to the modification of the average energy of the electrons, and their energy spread and density, which modifications reduce the gain G during the development of the laser macropulses. Ultimately, the growth in energy spread and reduction in density produce a kind of saturation phenomenon. Thus, when G=p, the laser attains in FIG. 6A its peak or maximum power, but the gain per pass thereafter continues to decrease, becoming lower than the losses so that the laser power decreases and the macropulse tends to extinguish itself.

When the laser action is stopped or reduced, either due to the above mentioned saturation effect or to external means, the evolution of the electron beam is no longer determined by the interaction with the light, but by the operating conditions in the storage ring which tend to restore the electron packet to its "normal" laser-off structure.

After a relaxation time, which is on the order of 100 milliseconds for an energy of 180 MeV, the gain increases and when it again attains the value G=p, a new laser macropulse may begin to develop. The relaxation time varies as the inverse third power of the electron energy.

This saturation/relaxation mechanism generates a series of macropulses separated by 10 to 25 milliseconds as shown in FIG. 7A. FIG. 7B shows the estimated evolution of gain during each of the macropulses of FIG. 7A and the relaxation of the electrons during the rise marked RN (for "natural relaxation").

The presence of time-dependent saturation and relaxation have the following consequences. The macroscopic laser output is pulsed, not continuous, and it adopts an erratic character, in which the amplitude, the period and the width of the macropulses can fluctuate strongly from pulse to pulse.

The average power of the laser is determined by these saturation mechanisms. The peak power of a macropulse is also limited by the saturation/relaxation mechanism. In particular, higher peak powers are obtained when the time between pulses approaches or exceeds the natural damping time of the electrons. These observations suggest a different mode of operation of the free electron laser. This mode may be called "controlled laser operation" and will now be described.

It has been observed that much more stable laser operation can be obtained by artificially forcing the laser to stop temporarily. This periodic suppression of laser operation can be accomplished in several ways.

It is possible to mismatch the pulses of the electrons and photons, either by slightly changing the rotation period of the electron packets in the storage ring or by transversely displacing the electron packets in relation to the axis of the optic cavity with the aid of an electric or magnetic field, in order to spoil the coupling of the photons and electrons. Alternatively, it would be possible to modify the losses of the optical cavity, or more generally, the alignment of the cavity.

The free electron laser thus improved can operate on a single pulse basis, or, preferably, periodically. This external control of the net laser gain is herein called "controlled laser operation."

By employing controlled operation, we obtain a perfectly stable laser from the point of view of periodicity, with improved stability in amplitude, without appreciable loss of average power and with much higher peak powers than when operated under natural conditions.

At present, the free electron laser using the Orsay collision ring could be controlled at any frequency between 10 Hz and 1 Hz. The modulation of the the net laser gain can, of course, be initiated more generally in accordance with the onset of an event which may be external or connected with the operation of the laser itself. In other words, the present invention permits not only the stabilization of the period of the laser, but also the realization of other kinds of operations such as single pulse operation, the partial modulation of laser output, or the realization of true CW laser operation. A more detailed description is given hereinafter.

The control of the laser can be effected by acting either on the synchronization of the rotation period of the electron packets in the ring with the period of the photons in the optical cavity, or on the coincidence of the trajectory of the electron packets in the undulator with the optical axis of the cavity, or again on the electronic density and dimensions of the electron packet, or, finally, on the losses of the cavity themselves.

The example described hereafter involves mainly the modification of the rotation period of the electrons in the storage ring which permits an increase of peak power of the laser and a stabilization of the latter or, as a variation, the modulation of laser output.

Figure 8:
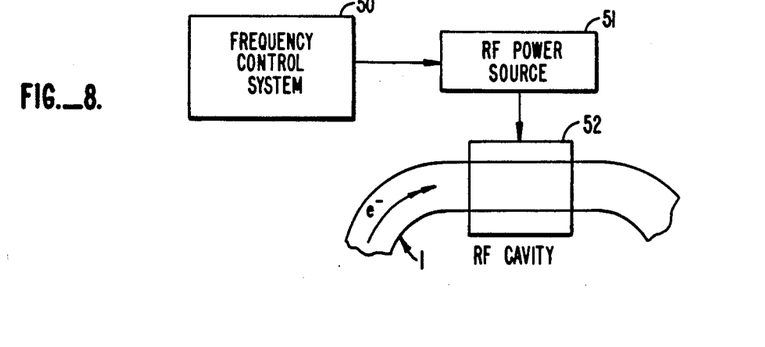
FIG. 8 is a partial schematic showing one special embodiment of the control devices.

FIG. 8 illustrates one part of the storage ring shown in 1. Said storage ring is equipped with a microwave cavity 52, connected to a RF power source 51. The rotation frequency of the electrons in the storage ring is determined by the frequency of the RF power source 51 which feeds cavity 52. A frequency control system 50 is envisaged which acts on the RF power source 51 so as to vary the frequency of the latter and thus the rotation frequency of the electron packets in the ring.

Figure 9A:
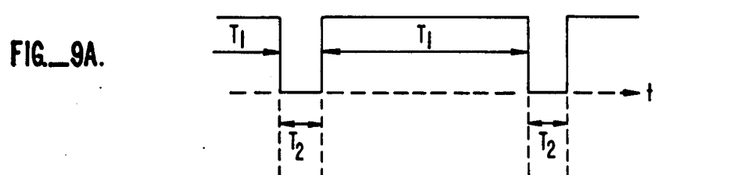
FIGS. 9A to 9D are timing diagrams showing the role of the control devices.

The frequency modification is effected preferably as indicated in FIG. 9A.

During time intervals T1, the frequency applied to the cavity is such that the rotation period of the electron packet in the ring is desynchronized in relation to the circulation period of the photons in the optical cavity 3 (FIG. 1). Under these conditions there is no laser effect and the optical cavity 3 will support only photon pulses of the kind shown in FIG. 5, with a period slightly different from 37 nanoseconds, as determined by the RF cavity frequency. During times T2, on the other hand, the RF power source 51 is brought to the frequency corresponding exactly to synchronization of the electron packets in the storage ring with the circulation period of the photons in the optical cavity 3. Under these conditions, a laser pulse develops in the cavity as illustrated on FIG. 6A and 6B. But the operation is no longer the same as the natural operation described above. During the time intervals T1 in which laser amplification was suppressed, the electron packets recovered their normal laser-off characteristics, in which state a gain Gmax can be obtained (FIGS. 6B and 7B). In other words, during the time intervals T1, the electron packet(s) relax towards their normal state of large gain, so that—when the synchronization of the periods of electron and photon packets is reestablished (interval T2)—the laser macropulse is formed from a state of large gain and said laser pulse reaches a high peak amplitude before the above-described saturation phenomena can reduce the gain.

FIG. 9A illustrates a succession of states T1 and T2 of the control signal 50 of the power source 51. During the states T1 the electron packets attain a state which would correspond (if laser oscillation was possible) to a very high gain in the cavity. FIG. 9C represents the gain which would be available if the conditions for laser operation were restored. The actual gain is shown in FIG. 9D which is limited to those parts of FIG. 9C to where laser operation is possible during the intervals T2.

Figure 9B:
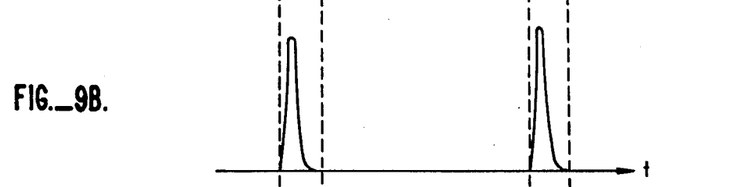
Figure 9C:
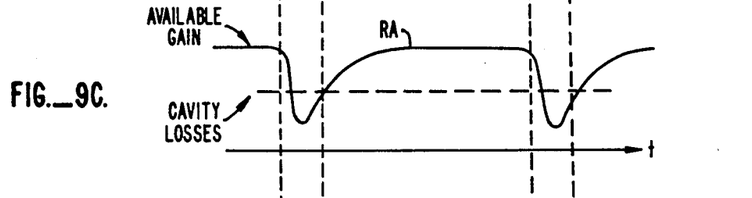
Figure 9D:
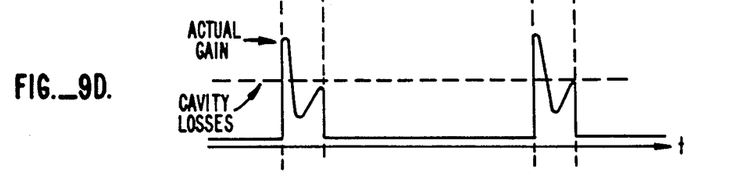

FIG. 9B shows the general form of laser pulses obtained during the time intervals T2. We can see that the period of said pulses is well stabilized, that their peak amplitude is very large and the amplitude is much more stable than before.

Returning briefly to FIG. 9C, we may consider that the portions of the curve shown which correspond to intervals T1—the portions marked RA—which correspond to the forced relaxation of the laser. This forced relaxation is much more effective than the natural relaxation RN shown in FIG. 7B.

Figure 10:
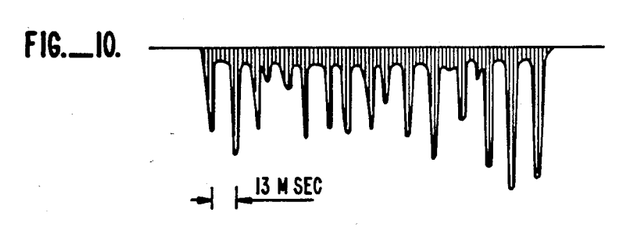
FIGS. 10, 10A and 10B are reproductions of the experimental waveforms showing the effects of the control signals.
Figure 10A:
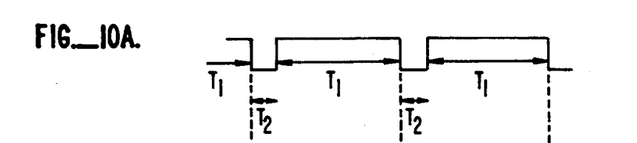
Figure 10B:
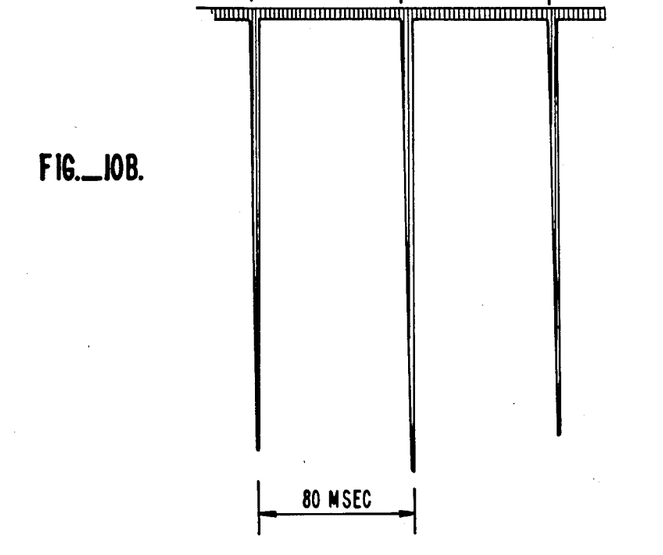

FIGS. 10, 10A and 10B show the experimentally obtained curves.

FIG. 10 corresponds to natural laser operation, i.e., without the external control of the net gain. We note that the periodicity of the laser pulses (macropulses) is fairly variable, as is their amplitude. The average period in this case is on the order of 13 milliseconds.

FIG. 10A shows the form of a control signal SC which may be applied to the generator 50 to vary the rotation frequency of the electron packets in the storage ring. As above described, this signal creates the periods P1 of desynchronization, separated by periods P2—in this case shorter—of synchronization. We can immediately recognize that the laser pulses produced and shown in FIG. 10B have a very stable period defined by the period of signal SC, here 80 milliseconds. They also have a much larger and stable amplitude than that of FIG. 10. The vertical scales of FIGS. 10A and 10B are different; the pulses of FIG. 10B are approximately twenty times larger than those of FIG. 10A. During the sequence T1 we suppress or greatly reduce the photon/electron interaction to keep the available gain high, or allow the electrons to relax as rapidly as possible. During the sequence T2, the interaction of the photons and electrons is brought to a maximum to develop an intense laser pulse. In most cases, the sequence T2 will be shorter than the sequence T1.

In a special experiment using this first type of control (stabilization of peak amplitude and its period) the following results were obtained: an increase of peak power by a factor of 20; a reduction of the width of the macropulses to one millisecond from the three milliseconds width observed during natural operation; preservation of average power of the laser provided that the frequency of the control pulses was kept above 10 Hz; an increase of the energy of each laser macropulse if the repetition rate of the control signal SC is lower than the natural repetition rate; the possibility of controlling the appearance of laser pulses at will as a function of an outside event, since the sequence T2 can be triggered at any time as long as the preceding sequence T1 has been long enough to attain positive net gain; the possibility of obtaining a perfectly periodic laser of stable amplitude (note that in controlled operation at 12 Hz, under conditions corresponding to natural operation at approximately 80 Hz, the fluctuations of the peak amplitude which were ±100% in actual operation are reduced to ±5% in controlled operation).

When employing the first type of control as described above, the duration of the sequence T2 is longer than the natural width of the laser macropulse, i.e., we leave this macropulse to evolve freely and the above-described saturation mechanisms reduces the net gain to negative values.

A second type of operation is possible in which the duration of sequence T2 is reduced so as to stop the laser pulse before it is fully developed. In this case, it is possible to keep the available gain per pass always larger than the losses. In this mode of operation, it has been observed that one may not only reduce the duration of sequence T2, but also considerably reduce that of sequence T1, since the laser can start up again instantly if the condition is always G higher than p.

In other words, it is thus possible to increase the macropulse repetition rate practically without loss of average power, provided that one correctly regulates the ratio T1/T2.

Figure 11A:
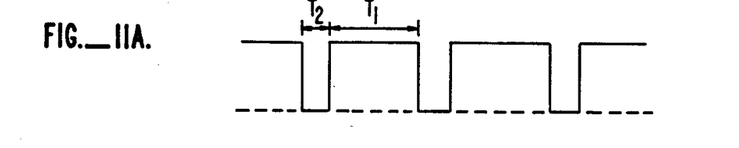
FIGS. 11A to 11C are temporal diagrams illustrating another means of control according to this invention.
Figure 11B:
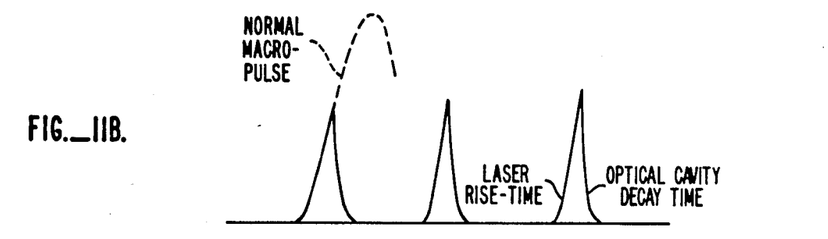

FIG. 11A shows an example of a control signal of this second type. During the sequence T2, a pulse develops which is truncated in relation to the normal laser pulse shown by the dotted line in FIG. 11B. From the end of sequence T2, the laser pulse drops off during a time which is defined by the decay time of the optical cavity, i.e., the time during which the photons can be stored in the cavity in the absence of gain.

Figure 11C:
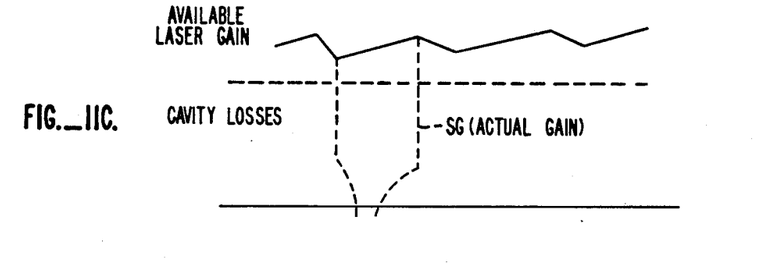

FIG. 11C is comparable to FIG. 9C and illustrates the available gain if laser operating conditions were restored, while the part shown in dotted lines and marked SC shows the actual gain, taking into account the fact that laser action has been suppressed during sequence T1 (as has been illustrated in FIG. 9B).

FIG. 11C, showing the available gain, shows that the theoretical gain associated with the state of the beam can always remain higher than the losses p.

Experiments carried out this way permitted the operation of a free electron laser at a repetition frequency on the order of 2 kHz, i.e., 25 times higher than the natural frequency.

Another variation of this controlled operation could also be observed, conforming to the general lines of the first type of operation.

Until now it was assumed that there would be a complete suppression of laser gain during the period T1, i.e., that the laser would start anew at the beginning of each period T2.

It is possible that during period T1 the actual gain of the laser is reduced without completely cancelling it out.

Provided that the pulse repetition rate is fairly high, the free electron laser then adopts a pseudo-continuous structure, i.e., the large natural fluctuation is suppressed, with only a slightly fluctuating amplitude due to the modulation of the gain. In this case, the effect of control is to prevent the laser from reaching the saturation level, while maintaining sufficient gain during period T1 to keep the laser from stopping.

This mode of operation provides the capability to modulate the free electron laser power output.

From these examples, we see that the invention makes it possible to operate a free electron or positron laser under control by a phenomenon or signal which could be external or internal. The laser waveform obtained can be single pulse, periodic over a fairly large range of frequencies or even "pseudo-continuous."

The external phenomenon controlling the laser can take very many forms, from a simple external logic pulse for single pulse laser operation to control by an external oscillator which permits us to obtain a perfectly periodic laser waveform.

One variation consists of using a parameter associated with the operation of the laser or the storage ring itself to generate a control signal. In the latter case, we can realize a form of feedback which makes it possible to stabilize the laser, to make it self-oscillating, or to trigger the laser only when the electron packet fulfills certain conditions.

Depending upon the applications, the advantages obtained are diverse, but as a general rule, we always obtain not only an increase in peak power and stability but an improvement of the repetition rate and stability of the macropulses. The application of controlled operation to realize single-shot laser operation or the modulation of the laser amplitude at the frequency of the control signal are representative of the possible improvements in laser operation.

In the above, we have described various applications of the invention using a control device which acted to modify the rotation period of the electron beam in the storage ring.

Let us now consider other means of control which can be used according to this invention and which are here indicated without constituting any limitation.

The above described means of control has the advantage of permitting a very rapid changeover between states T1 and T2. However, it is more difficult to apply when a progressive modification of the gain is required.

Other control devices permit a modification of electronic density. As an example, we can modify the transverse dimensions of the electron beam. It is well known that one can excite the electron beam by a random external signal source ("noise"). In principle, the noise source can be triggered to increase the transverse dimensions of the electron beam. The present invention then could be realized by controlling the amplitude of the noise by the outside signal SC or SC2 so as to produce a reduction of optical gain.

Alternatively, on a storage ring we define an operating point at which the characteristics of the electron packet are determined by the elements and configuration of the ring, such as its high frequency cavity, and the elements determining the betatron tunes, especially the quadrupole and sextupole magnets. One can then modify one or more of these elements, suitably selected, to cause a change in the electronic density, dispersion in energy of the electrons, length of the electron packet or even modify the trajectory of the electron packet inside the ring, so that it no longer passes exactly on the axis of the optical cavity.

These modifications of the state of the electron beam can be used in two different ways: by reducing the gain, employing the control signal SC or SC2 to act one one of the elements of the ring to reduce the charge density or spoil the beam alignment; or by increasing the gain, either by increasing the electronic density or by reducing the electrons' dispersion in energy.

Acting in this latter way, one defines a new "normal state" of the electron packet from which one may carry out a controlled reduction of gain by the means described above.

This alternative embodiment deserves further comment, for in certain cases, this new "normal state" can be obtained only for a limited duration and controlled laser operation then needs a double control signal.

Figure 12:
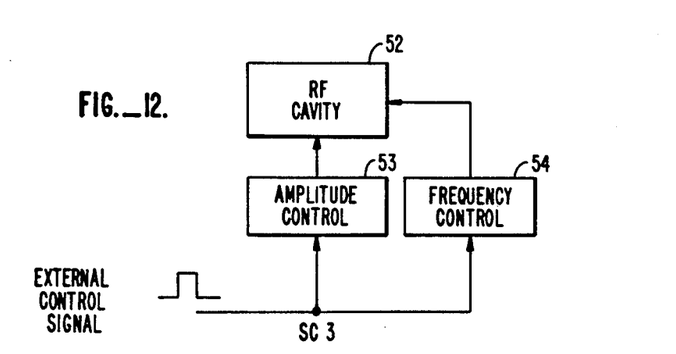
FIG. 12 shows another embodiment of the means of control.

As an example, consider the device illustrated in FIG. 12. The high frequency cavity 52 is controlled in frequency as before by an oscillator 54, but also in amplitude by a modulator 53. The elements 53 and 54 are both under control of an external signal SC3.

We know that a radio frequency cavity placed on a ring restores the energy to the electron packet which it has lost at each rotation. The frequency of the cavity determines the rotation period, while the amplitude of the radio frequency field applied by said cavity to the electrons determines the length of the electron packet and determines its energy dispersion and on its angular dispersion.

The control signals illustrated in FIG. 12 act simultaneously on the amplitude and on the frequency of the electromagnetic field applied to the electron packets in the cavity, in order to synchronize the electrons and photons in the optical cavity and also to cause an increase of gain by increasing the voltage of the radio frequency cavity. One may employ such an increase in gain to obtain even greater peak powers.

In this embodiment, during the periods T1 we obtain both a desynchronization of electrons in relation to the photons and simultaneously a return of the radio frequency cavity to its normal voltage to allow the electron packet to relax to its normal state. During the periods T2 we reestablish at the same time the synchronization and a gain higher than that available in normal level.

Other control devices can be obtained by modifying the relative position of the average trajectory of the electron packets in relation to the optical axis of cavity 3.

FIG. 13 illustrates schematically the installation of two electrodes 55 in ring 1, excited by a control signal 56. These electrodes are designed so that the electron beam is deflected along the trajectory FD (drawn as a solid black line), from the initial or normal trajectory FN. The control signal 56 has one of the forms SC or SC2 described above. During the intervals T1, the trajectory of the electron packets is FD, there is no laser effect and the electron packets relax towards a state corresponding to high available gain. During the intervals T2, the electron packets return to their normal trajectory FN and the laser effect is produced in a way comparable to the one above described.

FIG. 13 is, of course, only a very schematical illustration and it may be necessary in practice to use several sets of electrodes arranged along the ring to simultaneously produce the deflection of the trajectory desired within the undulator 2 while producing an acceptable electron trajectory in the rest of the ring.

In practice, a displacement of the trajectories FD and FN on the order of 0.2 mm can be produced by application of 200 volts to the two sets of electrodes, and a similar deviation has been sufficient to stop the laser.

This device permits not only a rapid variation of the gain, but also a progressive reduction of the latter, depending on the voltage applied and therefore permits an "all or nothing" switching as well as a more gradual gain modulation.

Of course, the electrodes 55 in FIG. 13 which produce the deflecting electric field may be replaced by coils producing a deflecting magnetic field as would be known by anyone skilled in the art.

FIG. 14 illustrates a variation of FIG. 13 in which we have placed the electrodes 57 and 58 at the entrance and exit to the undulator, fed by opposite voltages −V and +V, said electrodes permitting deflection of the electron packets in the undulator while ensuring total decoupling between the trajectory of the electrons in the undulator and the trajectory of the electron packets in the rest of the ring.

Figure 15:
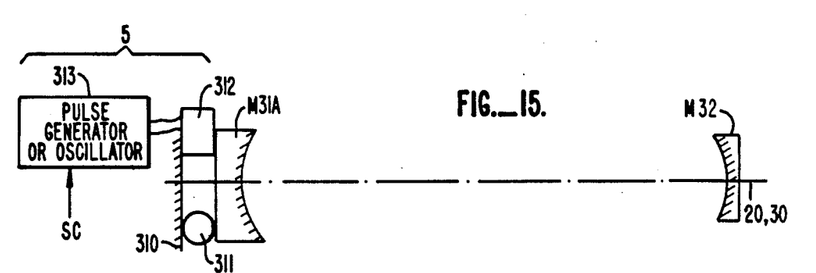

FIG. 15 illustrates yet another variation of control devices which act on the optical axis of the cavity. One (at least) of the mirrors—here mirror M31A—is supported on one side by the support 311 in contact with a frame 310. Its upper point of contact is defined by a piezoelectric ceramic 312 fed by an oscillator 313, to excite acoustic oscillations in said ceramic. While the ceramic is excited, mirror M31A is subject to oscillations in relation to the optical axis 30 which misalign the optical cavity, which is, therefore no longer able to function. In this embodiment, the period T1 corresponds to the excitation of the piezoelectric ceramic, while the excitation is stopped during the periods T2.

Another variation would consist of mounting mirror M31A and its mount of a piezoelectric cermaic such as 312, so as to modulate the length of the cavity instead of deflecting the axis of mirror M31A in relation to the axis 30 of the cavity.

The experiments we have carried out use mirrors having a radius of curvature of 3 meters for a cavity length of about 5.5 m. It has been observed that it is sufficient to deflect a mirror by $2.10^{-4}$ radians to stop the laser.

It is also possible to act on the losses of the optical cavity by modifying them in various ways. In the above, we have described modifications of the optical mode of the cavity or modification of the optical axis. When these perturbations are of sufficient amplitude, these modifications can cause diffraction losses comparable to the net losses caused by mirror absorption and transmission.

Another way to spoil the net gain is to introduce an absorbing element into the optical cavity, the simplest of which would be a mechanical shutter or a partially transmitting transparent blade. We could also introduce an element which deflects the photons (a mirror or prism) so that the photons no longer reach the cavity mirrors. Those skilled in the arts know many devices of this kind which could be applied to enhance the losses of the optical cavity.

It has been indicated above that the free electron lasers have the property of being continuously tunable over a vast range of wavelengths. We have also indicated that this variation of wavelength is obtained mainly by modification of the energy of the electrons and/or the amplitude of the magnetic field of the undulator.

It is then possible to introduce into the cavity a dispersive system, which limits the cavity to a single operating wavelength.

In this case, any modification of energy or of the magnetic field in the undulator would cause the laser to stop. With such a dispersive cavity, controlled laser operation can be attained by modifying the electron energy or field in the undulator in accordance with one or the other of signals SC or SC2 as described above.

In the description given until now, the electron source used was a storage ring, i.e., a circular accelerator in which the electron packets pass repeatedly through the undulator and radiate at each passage. This is the preferred embodiment of the invention.

Figure 16:
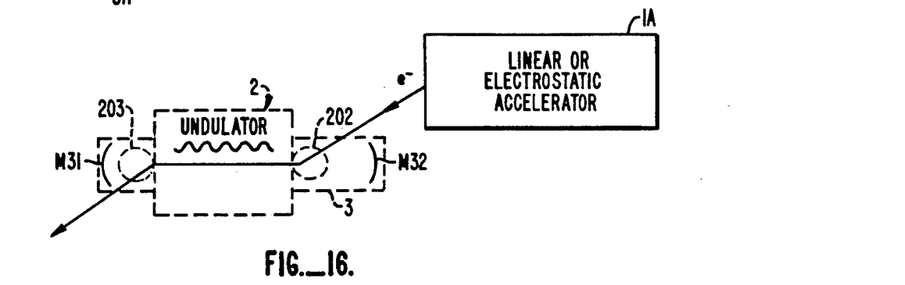
FIG. 16 shows a variation of the invention in which the accelerator devices are other than a storage ring.

However, the invention can also be employed to modulate or stabilize the output lasers employing non-circular accelerators such as microwave linear accelerators, induication accelerators, or electrostatic accelerators. In this configuration, a linear accelerator or an electrostatic accelerator 1A injects electron packets, marked E, to an undulator, the electrons being deflected to enter into the undulator at 202 and exit at 203 by electrostatic and/or electromagnetic means. The electron packets radiate in the undulator as previously described and the photons circulate in the optical cavity defined by mirrors M31 and M32. Laser effects have been obtained under these conditions. In this embodiment of the invention, control of the laser gain or loss can stabilize laser power output by limiting the intracavity power density to values below the threshold for the sideband instability.

We claim:

1. A method of stabilizing the operation of a free electron laser in which a relativistic electron beam exchanges energy with a photon beam comprising the steps of:
    establishing laser operation, the laser operation being inherently characterized by a gain which decays as the laser amplitude grows, thereby causing the optical field first to grow to a maximum and then to decay; and
    reducing the net gain, that is the value of gain minus the value of loss, prior to the time that the optical field reaches its minimum value following its initial growth.

2. The method of claim 1 wherein said reducing step comprises the step of reducing the electron/photon interaction.

3. The method of claim 1 wherein said reducing step comprises the step of increasing the loss.

4. A storage ring free electron laser comprising:
    undulator means defining a laser section in which a relativistic electron beam consisting of a number of one or more electron packets is caused to undergo periodic transverse deflections, said electron beam being characerized by an electron energy distribution and an electron spatial distribution;
    optical cavity means for propagating an electromagnetic wave consisting of a number of one or more photon pulses in the vicinity of said laser section, said optical cavity means being characterized by an optical axis and a round-trip time, said electromagnetic wave being characerized by an optical amplitude, a photon spectral width, a photon temporal width, and a photon spatial distribution;
    storage ring means for extracting said electron beam from said laser section and reinjecting said electron beam into said laser section to cause a succession of electron packet passes through said laser section;
    the intervals between successive electron packet passes through said laser section being synchronized with said round-trip time so that at least a portion of said electron beam periodically overlaps with at least a portion of said electromagnetic wave on passage through said laser section, the result of which is an interaction in which a portion of the energy of said electron beam is converted to light with an optical gain G;
    said gain being a function of the periodic overlap, said optical amplitude, and a set of parameters including said electron energy distribution, said electron spatial distribution, and said photon temporal and spectral widths, said gain having a maximum value during operation;
    said interaction altering at least one of said set of parameters so as to cause said gain to decrease on successive electron packet passes from said maximum value, said interaction resulting in the formation of a train of optical pulses; and
    control means for alternately varying said gain between first and second states of respectively lower and higher gain so as to permit control over the temporal profile and peak power of said train of optical pulses.

5. The laser of claim 4 wherein said control means alternately varies said gain between said first and second states in a substantially periodic fashion.

6. The laser of claim 4 or 5 wherein:
said electron packets are characterized by a relaxation time determined at least in part by the characteristics of said storage ring means;
said first state of lower gain is characterized by substantially no laser amplification and has a duration greater than said relaxation time; and
said second state of higher gain has a duration on the order of said macropulse width;
whereby the peak power of said optical pulses is increased.

7. The laser of claim 4 or 5 wherein:
said interaction is characterized by a saturation/relaxation mechanism tending to impart a macropulse structure to said train of optical pulses, characterized generally by a macropulse width and a macropulse separation;
said first state of lower gain is characterized by substantially no laser amplification and has a duration at least comparable to said macropulse separation; and
said second state of higher gain has a duration on the order of said macropulse width;
whereby the peak power of said optical pulses is increased.

8. The laser of claim 5 wherein:
the decrease of said gain tends to impart a macropulse structure to said train of optical pulses, said macropulse structure having a characteristic natural width and separation; and
the duration of said second state is less than said characteristic natural width.

9. The laser of claim 8 wherein:
said first state is characterized by substantially no laser amplification and has a duration shorter than said characteristic natural separation;
whereby said train of optical pulses approaches continuous wave operation.

10. The laser of claim 4 wherein said control means acts on at least one of the group of electron packet characteristics including said electron energy distribution, said electron spatial distribution, and the trajectory of said electron beam in said laser section.

11. The laser of claim 10 wherein said control means includes a high-frequency cavity incorporated into said storage ring means and responsive to an external high-frequency control signal, thereby operating to change the mean electron energy and trajectory through said laser section.

12. The laser of claim 4 wherein said control means operates to change the intervals between successive electron packet entries into said laser section.

13. The laser of claim 4 wherein said control means includes means for displacing the axis of the average passage of electron through said laser section in relation to the axis of said undulator means.

14. The laser of claim 13 wherein said means for displacing includes means for subjecting said electron beam to an electrical field or a magnetic field.

15. The laser of claim 4 wherein said control means acts on at least one of the optical characteristics of said resonant cavity means including said round-trip time, a cavity loss coefficient, and the orientation of said optical axis.

16. The laser of claim 4 wherein said resonant cavity means includes at least one reflector, and wherein said control means includes:
a piezoelectric transducer coupled to said reflector, and
excitation means for energizing said transducer so as to displace the reflector and vary at least one of the spatial and angular coordinates thereof.

17. The laser of claim 4 wherein said resonant cavity means is dispersive in optical frequencies and wherein said control means acts on the electron energy or strength of said undulator means to change the optical frequency at which laser operation occurs.

18. A storage ring free electron laser comprising:
undulator means defining a laser section in which a relativistic electron beam consisting of a number of one or more electron packets is caused to undergo periodic transverse deflections, said electron beam being characterized by an electron energy distribution and an electron spatial distribution;
optical cavity means for propating an electromagnetic wave consisting of a number of one or more photon pulses in the vicinity of said laser section, said optical cavity means being characterized by an optical axis, round-trip time, and a loss coefficient p, said electromagnetic wave being characterized by an optical amplitude, a photon spectral width, a photon temporal width, and a photon spatial distribution;
storage ring means for extracting said electron beam from said laser section and reinjecting said electron beam into said laser section to cause a succession of electron packet passes through said storage ring means;
the intervals between successive electron packet passes of said electron beam through said laser section being synchronized with said round-trip time so that at least a portion of said electron beam periodically overlaps with at least a portion of said electromagnetic wave on passage through said laser section, the result of which is an interaction in which a portion of the energy of said electron beam is converted to light with an optical gain G;
said gain being a function of the periodic overlap, said optical amplitude, and a set of parameters including said electron energy distribution, said electron spatial distribution, and said photon temporal and spectral widths, said gain having a maximum value during operation;
said interaction altering at least one of said set of parameters so as to cause said gain to decrease on successive electron packet passes from said maximum value, said interaction resulting in the formation of a train of optical pulses; and
control means for alternately varying said loss coefficient between first and second states or respectively higher and lower loss so as to permit control over the temporal profile and peak power of said train of optical pulses.

19. The laser of claim 18 wherein said control means alternatley varies said loss coefficient between said first and second states in a substantially periodic fashion.

20. The laser of claim 18 or 19 wherein:
said electron packets are characterized by a relaxation time determined at least in part by the characteristics of said storage ring means;

said first state of higher loss coefficient is characterized by substantially no laser amplification and has a duration greater than said relaxation time; and said second state of lower loss coefficient has a duration on the order of said macropulse width;

whereby the peak power of said optical pulses is increased.

21. The laser of claim 18 or 19 wherein:

said interaction is characterized by saturation/relaxation mechanism tending to impart a macropulse structure to said train of optical pulses, characterized generally by a macropulse width and a macropulse separation;

said first state of higher loss coefficient is characterized by substantially no laser amplification and has a duration at least comparable to said macropulse separation; and said second state of lower loss coefficient has a duration on the order of said macropulse width;

whereby the peak power of said optical pulses is increased.

22. The laser of claim 18 wherein:

the decrease of said gain tends to impart a macropulse structure to said train of optical pulses, said macropulse structure having a characteristic natural width and separation; and the duration of said second state is less than said characteristic natural width.

23. The laser of claim 18 wherein said first state is characterized by substantially no laser amplification and has a duration shorter than said characteristic natural separation;

whereby said train of optical pulses approaches continuous wave operation.

24. The laser of claim 18 wherein said control means acts on at least one additional optical characteristic of said resonant cavity means including said round-trip time and the orientation of said optical axis.

25. The laser of claim 18 wherein said resonant cavity means includes at least one reflector, and wherein said control means includes:

a piezoelectric transducer coupled to said reflector, and excitation means for energizing said transducer so as to displace the reflector and vary at least one of the spatial and angular coordinates thereof.

26. The laser of claim 18 wherein said resonant cavity means is dispersive in optical frequencies and wherein said control means acts on the electron energy or strength of said undulator means to change the optical frequency at which laser operation occurs.

27. The laser of claim 18 wherein said control means further acts on at least one of the group of electron packet characteristics including said electron energy distribution, said electron spatial distribution, and the trajectory of said electron beam in said laser section.

28. A free electron laser comprising:

means for providing a relativistic electron beam consisting of a series of electron packets, said electron packets being characterized by an electron energy distribution and an electron spatial distribution;

undulator means defining a laser section in which said electron packets are caused to undergo periodic transverse deflections;

optical cavity means for propagating an electromagnetic wave consisting of a number of one or more photon pulses in the vicinity of said laser section, said optical cavity means being characterized by an optical axis and a round-trip time, said electromagnetic wave being characterized by an optical amplitude, a photon spectral width, a photon temporal width, and a photon spatial distribution;

the intervals at which said electron packets enter said laser section being synchronized with said round-trip time so that at least one of said number of photon pulses periodically overlaps with the electron packet that has entered said laser section, the result of which is an interaction in which a portion of the energy of said electron beam is converted to light with an optical gain G;

said gain being a function of the periodic overlap; said optical amplitude, and a set of a parameters including said electron energy distribution, said electron spatial distribution, and said photon temporal and spectral widths, said gain having a maximum value during operation;

said interaction altering at least one of said set of parameters so as to cause said gain to decrease on successive electron passes from said maximum value, said interaction resulting in the formation of a train of optical pulses; and control means for alternately varying said gain between first and seocnd states of respectively lower and higher gain so as to permit control over the temporal profile and peak power of said train of optical pulses.

29. The laser of claim 28 wherein said control means alternately varies said gain between said first and second states in a substantially periodic fashion.

30. The laser of claim 28 or 29 wherein:

said interaction is characterized by a saturation/relaxation mechanism tending to impart a macropulse structure to said train of optical pulses, characterized generally by a macropulse width and a macropulse separation;

said first state of lower gain is characterized by substantially no laser amplification and has duration at least comparable to said macropulse separation; and said second state of higher gain has a duration on the order of said macropulse width;

whereby the peak power of said optical pulses is increased.

31. The laser of claim 29 wherein:

the decrease of said gain tends to impart a macropulse structure to said train of optical pulses, said macropulse structure having a characteristic natural width and separation; and the duration of said second state is less than said characteristic natural width.

32. The laser of claim 31 wherein:

said first state is characterized by substantially no laser amplification and has a duration shorter than said characteristic natural separation;

whereby said train of optical pulse approaches continuous wave operation.

33. The laser of claim 28 wherein said control means acts on at least one of the group of electron packet characteristics including said electron energy distrubution, said electron spatial distribution, and the trajectory of said electron beam in said laser section.

34. The laser of claim 33 wherein said control means operates to change the intervals between successive electron packet entries into said laser section.

35. The laser of claim 28 wherein said control means includes means for displacing the axis of the average passage of electron through said laser section in relation to the axis of said undulator means.

36. The laser of claim 35 wherein said means for displacing includes means for subjecting said electron beam to an electrical field or a magnetic field.

37. The laser of claim 28 wherein said control means acts on at least one of the optical characteristics of said resonant cavity means including said round-trip time, a cavity loss coefficient, and the orientation of said optical axis.

38. A free electron laser comprising:
means for providing a relativistic electron beam consisting of a series of electron packets, said electron packets being characterized by an electron energy distribution and an electron spatial distribution;
undulator means defining a laser section in which said electron packets are caused to undergo periodic transverse deflections;
optical cavity means for propagating an electromagnetic wave consisting of a number of one or more photon pulses in the vicinity of said laser section, and said optical cavity means being characterized by an optical axis, a round-trip time and a loss coefficient, said electromagnetic wave being characterized by an optical amplitude, a photon spectral width, a photon temporal width, and a photon spatial distribution;
the intervals at which said electron packets enter said laser section being synchronized with said round-trip time so that at least of portion of said photon pulses periodically overlaps with the electron packet that has entered said laser section, the result of which is an interaction in which a portion of the energy of said electron beam is converted to light with an optical gain G;
said gain being a function of the periodic overlap, said optical amplitude, and a set of parameters including said electron energy distribution, said electron spatial distribution, and said photon temporal and spectral widths, said gain having a maximum value during operation;
said interaction altering at least one of said set of parameters so as to cause said gain to decrease on successive elctron packets from said maximum value, said interaction resulting in the formation of a train of optical pulses; and
control means for alternately varying said loss coefficient between first and second states of respectively higher and lower loss so as to permit control over the temporal profile and peak power of said train of optical pulses.

39. The laser of claim 38 wherein said control means alternately varies said loss coefficient between said first and second states in a substantially periodic fashion.

40. The laser of claim 38 or 39 wherein:
said interaction is characterized by a saturation/relaxation mechanism tending to impart a macropulse structure to said train of optical pulses, characterized generally by a macropulse width and a macropulse separation;
said first state of higher loss coefficient is characterized by substantially no laser amplification and has a duration at least comparable to said macropulse separation; and
said second state of lower loss coefficient has a duration on the order of said macropulse width;
whereby the peak power of said optical pulses is increased.

41. The laser of claim 39 wherein:
the decrease of said gain tends to impart a macropulse structure to said train of optical pulses, said macropulse structure having a characteristic natural width and separation; and
the duration of said second state is selected to be less than said characteristic natural width.

42. The laser of claim 41 wherein:
said first state is characterized by substantially no laser amplification and has a duration shorter than said characteristic natural separation;
whereby said train of optical pulses approaches continuous wave operation.

43. The laser of claim 38 wherein said control means acts on at least one additional optical characteristic of said resonant cavity means including said round-trip time.

44. The laser of claim 38 wherein said resonant cavity means includes at least one reflector and wherein said control means includes:
a piezoelectric transducer coupled to said reflector, and
excitation means for energizing said transducer so as to displace the reflector and vary at least one of the spatial and angular coordinates thereof.

45. The laser of claim 38 wherein said resonant cavity means is dispersive in optical frequencies and wherein said control means acts on the electron energy or strength of said undulator means to change the optical frequency at which laser operation occurs.

46. The laser of claim 38 wherein said control means acts on at least one of the group of electron packet characteristics including said electron energy distribution, said electron spatial distribution, and the trajectory of said electron beam in said laser section.

* * * * *